(12) United States Patent
Nakamoto et al.

(10) Patent No.: US 11,011,920 B2
(45) Date of Patent: May 18, 2021

(54) ENERGY STORAGE APPARATUS FOR ENGINE START-UP, METHOD FOR CONTROLLING THE SAME, AND VEHICLE

(71) Applicant: GS Yuasa International Ltd., Kyoto (JP)

(72) Inventors: Takeshi Nakamoto, Kyoto (JP); Daisuke Konishi, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 180 days.

(21) Appl. No.: 15/666,405

(22) Filed: Aug. 1, 2017

(65) Prior Publication Data

US 2018/0041054 A1    Feb. 8, 2018

(30) Foreign Application Priority Data

Aug. 5, 2016  (JP) .............................. JP2016-154944

(51) Int. Cl.
| | |
|---|---|
| H02H 7/18 | (2006.01) |
| H02J 7/00 | (2006.01) |
| H02J 7/14 | (2006.01) |
| B60R 16/033 | (2006.01) |
| H01M 10/052 | (2010.01) |
| H01M 4/58 | (2010.01) |

(52) U.S. Cl.
CPC .......... *H02J 7/0029* (2013.01); *B60R 16/033* (2013.01); *H02J 7/0026* (2013.01); *H02J 7/1461* (2013.01); *H02J 7/1492* (2013.01); *H01M 4/5825* (2013.01); *H01M 10/052* (2013.01); *H02J 7/0016* (2013.01); *H02J 7/0021* (2013.01); *H02J 7/00302* (2020.01); *Y02T 10/92* (2013.01)

(58) Field of Classification Search
CPC .................................................... B60R 16/033
USPC ......................................................... 307/10.7
See application file for complete search history.

(56) References Cited

U.S. PATENT DOCUMENTS

| | | | | |
|---|---|---|---|---|
| 5,694,025 A | * | 12/1997 | Oglesbee | ................ H02J 7/022 320/137 |
| 9,950,630 B2 | | 4/2018 | Date et al. | |
| 2004/0140139 A1 | | 7/2004 | Malik | |
| 2005/0246557 A1 | | 11/2005 | Vanzante | |

(Continued)

FOREIGN PATENT DOCUMENTS

| | | | | |
|---|---|---|---|---|
| EP | 2615297 A1 | * | 7/2013 | ........... B60R 16/033 |
| JP | 2005-318795 A | | 11/2005 | |

(Continued)

*Primary Examiner* — Rexford N Barnie
*Assistant Examiner* — Dru Parries
(74) *Attorney, Agent, or Firm* — McGinn I. P. Law Group, PLLC.

(57) ABSTRACT

An energy storage apparatus for engine start-up includes: an energy storage device, a first switch provided in a first energizing path to the energy storage device, a step-down circuit provided in a second energizing path to the energy storage device, and a controller. The controller turns the first switch on to discharge through the first energizing path at engine start-up, and turns the first switch off to select the second energizing path if an output voltage of a vehicle generator is higher than a predetermined voltage to cause the output voltage of the vehicle generator to be stepped down with the step-down circuit to charge the energy storage device.

20 Claims, 9 Drawing Sheets

(56) References Cited

U.S. PATENT DOCUMENTS

| | | | |
|---|---|---|---|
| 2013/0106180 A1 | 5/2013 | Akimasa et al. | |
| 2013/0249496 A1 | 9/2013 | Ju et al. | |
| 2014/0195078 A1* | 7/2014 | Severinsky | B60H 1/004 |
| | | | 701/22 |
| 2015/0180279 A1* | 6/2015 | Nielsen | H02J 9/062 |
| | | | 307/64 |
| 2016/0137092 A1* | 5/2016 | Thieme | B60L 11/1861 |
| | | | 307/10.6 |
| 2016/0193929 A1 | 7/2016 | Sakakibara | |

FOREIGN PATENT DOCUMENTS

| | | |
|---|---|---|
| JP | 2011-223755 A | 11/2011 |
| JP | 2013-201888 A | 10/2013 |
| JP | 2014-131479 A | 7/2014 |
| JP | 2014-166020 A | 9/2014 |
| JP | 2014-217170 A | 11/2014 |
| JP | 2015-058826 A | 3/2015 |
| JP | 2016-105667 A | 6/2016 |
| WO | WO 2009/025307 A1 | 2/2009 |
| WO | WO 2012/008124 A1 | 1/2012 |
| WO | WO 2014/188541 A1 | 11/2014 |

\* cited by examiner

FIG. 8

| MODE | | | SEMICONDUCTOR SWITCH Q1 | SEMICONDUCTOR SWITCH Q2 |
|---|---|---|---|---|
| DURING DISCHARGE | | NORMAL MODE | HOLDING ON | HOLDING OFF |
| DURING CHARGE | OUTPUT VOLTAGE Vs IS EQUAL TO OR LESS THAN PREDETERMINED VOLTAGE Vt | NORMAL MODE | HOLDING ON | HOLDING OFF |
| | OUTPUT VOLTAGE Vs IS HIGHER THAN PREDETERMINED VOLTAGE Vt | STEP-DOWN MODE | HOLDING OFF | SWITCHING CONTROL |

… # ENERGY STORAGE APPARATUS FOR ENGINE START-UP, METHOD FOR CONTROLLING THE SAME, AND VEHICLE

CROSS-REFERENCE TO RELATED APPLICATIONS

This application is based on Japanese Patent Application No. 2016-154944 filed on Aug. 5, 2016, the entire contents of which are hereby incorporated by reference.

FIELD

The present invention relates to an energy storage apparatus for engine start-up.

BACKGROUND

Since an energy storage apparatus for engine start-up needs to momentarily pass a large cranking current at engine start-up, the response of power needs to be high so that a large current can be momentarily supplied. In addition, the energy storage apparatus for engine start-up is configured to be charged by an alternator while a vehicle is traveling. It should be noted that the document related to the energy storage apparatus for engine start-up includes, for example, JP 2013-201888 A.

When charged with a voltage higher than an appropriate charge voltage, the energy storage apparatus is overcharged. In order to prevent the overcharge of the energy storage apparatus, it is conceivable to provide a step-down circuit inside the energy storage apparatus to adjust the charge voltage to an appropriate value. However, since the energy storage apparatus for engine start-up needs to have high response of power so that a large current can be momentarily supplied, it has been required that the energy storage apparatus is prevented from becoming overvoltage while the response at engine start-up is secured.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to prevent an energy storage apparatus from being applied with overvoltage while the response at engine start-up is secured.

An energy storage apparatus for engine start-up includes: an energy storage device, a first switch provided in a first energizing path to the energy storage device, a step-down circuit provided in a second energizing path to the energy storage device, and a controller, wherein the controller turns the first switch on to discharge the energy storage device through the first energizing path at engine start-up, and turns the first switch off to select the second energizing path if an output voltage of a vehicle generator is higher than a predetermined voltage to cause the output voltage of the vehicle generator to be stepped down with the step-down circuit to charge the energy storage device.

BRIEF DESCRIPTION OF DRAWINGS

The foregoing and other features of the present invention will become apparent from the following description and drawings of an illustrative embodiment of the invention in which:

FIG. 8 is a table summarizing the switching patterns of the semiconductor switches Q1 and Q2.

DESCRIPTION OF EMBODIMENTS

Figure 1:
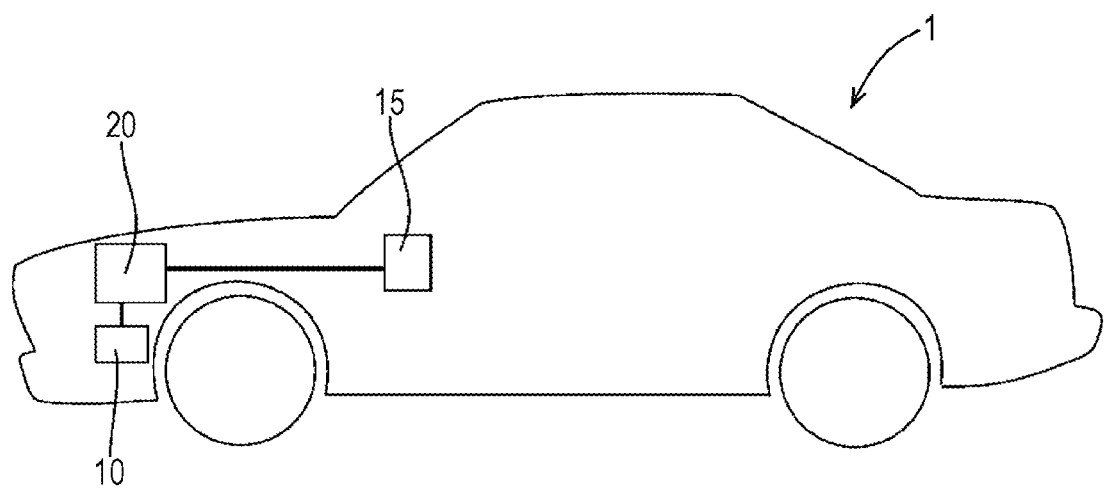
FIG. 1 is a side view of a vehicle.

An energy storage apparatus for engine start-up includes: an energy storage device, a first switch provided in a first energizing path to the energy storage device, a step-down circuit provided in a second energizing path to the energy storage device, and a controller, wherein the controller turns the first switch on to discharge the energy storage device through the first energizing path at engine start-up, and turns the first switch off to select the second energizing path if an output voltage of a vehicle generator is higher than a predetermined voltage to cause the output voltage of the vehicle generator to be stepped down with the step-down circuit to charge the energy storage device. It should be noted that the predetermined voltage is the upper limit of the appropriate charge voltage of the energy storage apparatus.

A method for controlling an energy storage apparatus for engine start-up includes: discharging through a first energizing path having higher response than a second energizing path including a step-down circuit at engine start-up; and selecting the second energizing path if an output voltage of a vehicle generator is higher than a predetermined voltage to step down the output voltage of the vehicle generator with the step-down circuit to charge.

According to the energy storage apparatus for engine start-up disclosed in the present specification, it is possible to prevent the energy storage apparatus from being applied with overvoltage while the response at engine start-up is secured.

First, the outline of the energy storage apparatus for engine start-up disclosed in the present embodiment will be described.

The energy storage apparatus for engine start-up includes: an energy storage device, a first switch provided in a first energizing path to the energy storage device, a step-down circuit provided in a second energizing path to the energy storage device, and a controller, wherein the controller turns the first switch on to discharge the energy storage device through the first energizing path at engine start-up, and turns the first switch off to select the second energizing path if an output voltage of a vehicle generator is higher than a predetermined voltage to cause the output voltage of the vehicle generator to be stepped down with the step-down circuit to charge the energy storage device. Since selecting the first energizing path at engine start-up, this configuration can have a high response and momentarily discharge a large current. In addition, during charging, when the output voltage of the vehicle generator is higher than the predetermined voltage, the output voltage is stepped down, so that the energy storage apparatus can be prevented from being applied with overvoltage.

In addition, as an aspect of the energy storage apparatus for engine start-up disclosed in the present embodiment, the step-down circuit includes a step-down chopper including: a second switch provided in the second energizing path, a reactor provided in the second energizing path, the reactor having one end connected to the second switch and having another end connected to a positive electrode of the energy storage device, and a freewheeling diode having a cathode connected to an intermediate connection point between the second switch and the reactor and having an anode connected to a negative electrode of the energy storage device. In this configuration, since the output voltage of the step-down circuit can be adjusted in multiple stages by the switching of the duty ratio of the second switch, the charge voltage can be adjusted to an appropriate voltage.

In addition, as an aspect of the energy storage apparatus for engine start-up disclosed in the present embodiment, the energy storage apparatus for engine start-up further includes a detection unit configured to detect an output voltage of the vehicle generator. In this configuration, the output voltage of the vehicle generator can be detected on the battery side. Therefore, for example, even when the vehicle having specifications that do not allow the communication with a battery has a battery mounted, the charge voltage can be adjusted to an appropriate voltage by the battery alone.

In addition, as an aspect of the energy storage apparatus for engine start-up disclosed in the present embodiment, the energy storage apparatus for engine start-up further includes external terminals to which the vehicle generator is connected; and the detection unit detects the voltage between the external terminals as the output voltage of the vehicle generator. According to this configuration, the output voltage of the vehicle generator can be detected with a simple configuration.

In addition, as an aspect of the energy storage apparatus for engine start-up disclosed in the present embodiment, the step-down circuit steps down the output voltage of the vehicle generator to an appropriate value equal to or less than the predetermined voltage. According to this configuration, even when the output voltage of the vehicle generator is higher than the predetermined voltage, the energy storage device can be charged to an appropriate value equal to or less than the predetermined voltage.

In addition, as an aspect of the energy storage apparatus for engine start-up disclosed in the present embodiment, the energy storage apparatus for engine start-up further includes a plurality of discharge circuits, wherein the energy storage device comprises a plurality of energy storage devices connected in series, the discharge circuits are connected in parallel with the energy storage devices and are configured to discharge the energy storage devices, and the controller operates the discharge circuits to equalize voltages of the energy storage devices while the energy storage devices is charged. In this configuration, the voltages of the energy storage devices can be equalized. Therefore, the specific energy storage device can be prevented from being applied with overvoltage due to the voltage variation.

In addition, as an aspect of the energy storage apparatus for engine start-up disclosed in the present embodiment, the first switch includes an FET including a parasitic diode having a forward direction in a discharge direction. In this configuration, turning off the FET allows only the charge to be blocked and the discharge to be continued.

In addition, the energy storage device includes an iron phosphate-based lithium ion secondary battery. In the iron phosphate-based lithium ion secondary battery, the voltage tends to rise at an end stage of the charge and tends to be applied with overvoltage. Applying the present technique allows the lithium ion secondary battery to be prevented from being applied with overcharge and the safety of the battery to be secured.

Embodiment

One embodiment of the present invention will be described with reference to FIGS. 1 to 9.

1. Description of Battery

Figure 2:
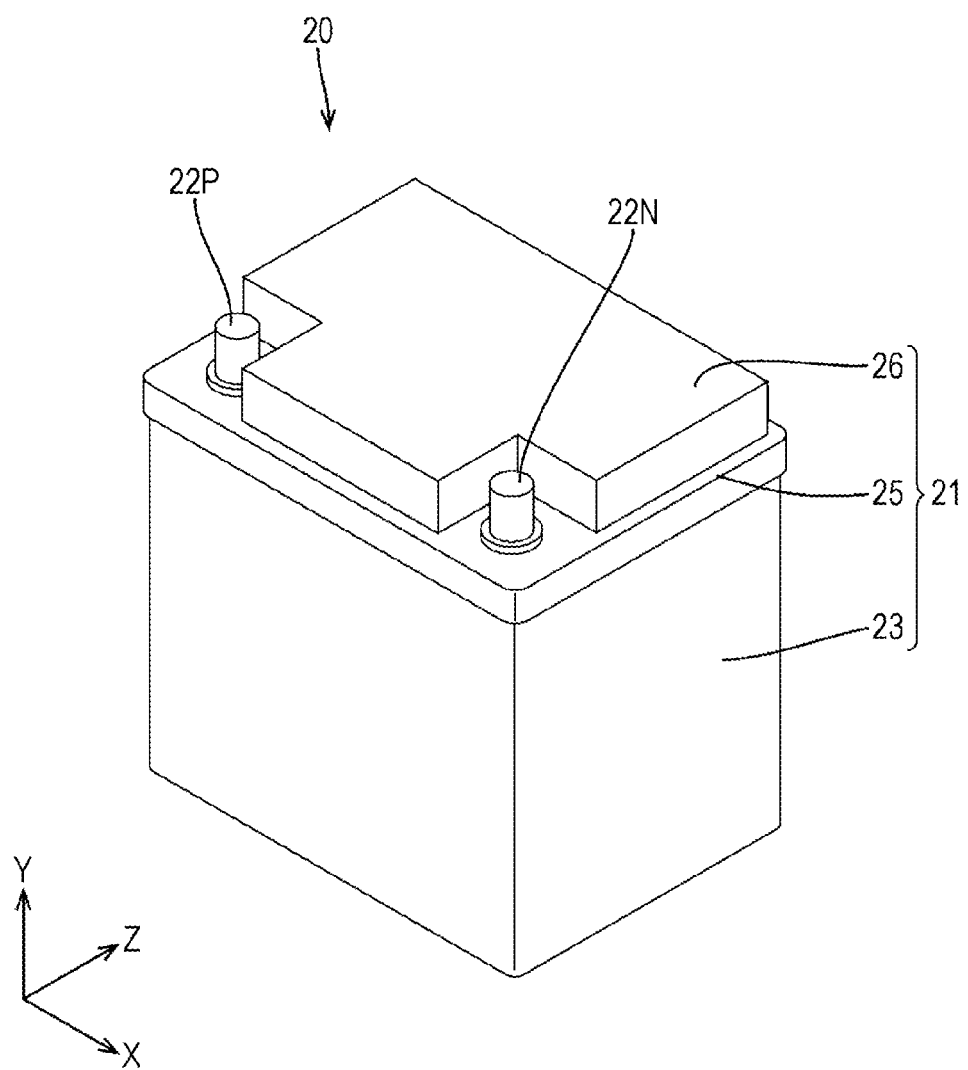
FIG. 2 is a perspective view of a battery.
Figure 3:
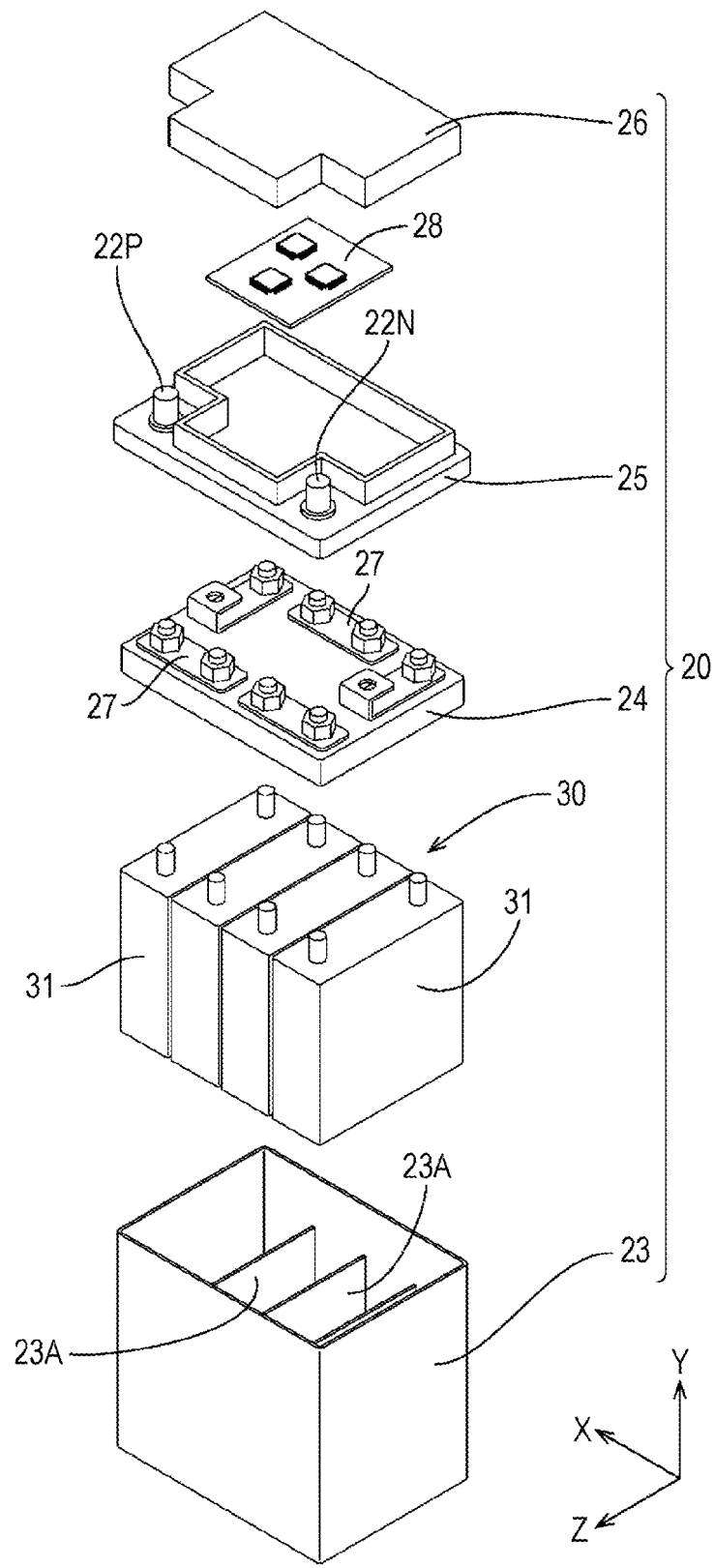
FIG. 3 is an exploded perspective view of the battery.

FIG. 1 is a side view of a vehicle, FIG. 2 is a perspective view of a battery, and FIG. 3 is an exploded perspective view of the battery.

As shown in FIG. 1, the vehicle 1 includes an engine start-up device 10, an alternator 15, and a battery 20. It should be noted that the battery 20 corresponds to the "energy storage apparatus", and the alternator corresponds to the "vehicle generator".

As shown in FIG. 2, the battery 20 includes a block-shaped battery case 21. An assembled battery 30 including a plurality of secondary batteries 31, and a circuit board 28 are accommodated in the battery case 21. It should be noted that in the following description, when FIGS. 2 and 3 are referred to, the vertical direction of the battery case 21 when the battery case 21 is placed horizontally without tilting with respect to the installation surface will be described as the Y direction, the direction along the longitudinal direction of the battery case 21 will be described as the X direction, and the depth direction of the battery case 21 will be described as the Z direction.

As shown in FIG. 3, the battery case 21 is configured to include a case body 23 in a box shape opening upward, a positioning member 24 for positioning the plurality of secondary batteries 31, an inner lid 25 mounted on the upper portion of the case body 23, and an upper lid 26 mounted on the upper portion of the inner lid 25. In the case body 23, as shown in FIG. 3, a plurality of cell chambers 23A in which the respective secondary batteries 31 are individually accommodated are provided side by side in the X direction.

As shown in FIG. 3, the positioning member 24 includes a plurality of bus bars 27 arranged on the upper face, and the positioning member 24 is positioned in the upper portion of the plurality of secondary batteries 31 arranged inside the case body 23, whereby the plurality of secondary batteries 31 are positioned, and are connected in series by the plurality of bus bars 27.

As shown in FIG. 2, the inner lid 25 has an approximately rectangular shape in a plan view, and has a shape with a height difference in the Y direction. A pair of terminals 22P and 22N to which a harness terminal (not shown) is connected is provided at both ends of the inner lid 25 in the X direction. The pair of terminals 22P and 22N is made of a metal such as a lead alloy, for example, 22P is a positive electrode terminal, and 22N is a negative electrode terminal. It should be noted that the positive electrode terminal 22P and the negative electrode terminal 22N are an example of the "external terminal".

In addition, as shown in FIG. 3, the inner lid 25 can accommodate the circuit board 28 therein, and when the inner lid 25 is mounted on the case body 23, the secondary battery 31 and the circuit board 28 are connected to each other.

2. Electrical Configuration of Battery 20

Figure 4:
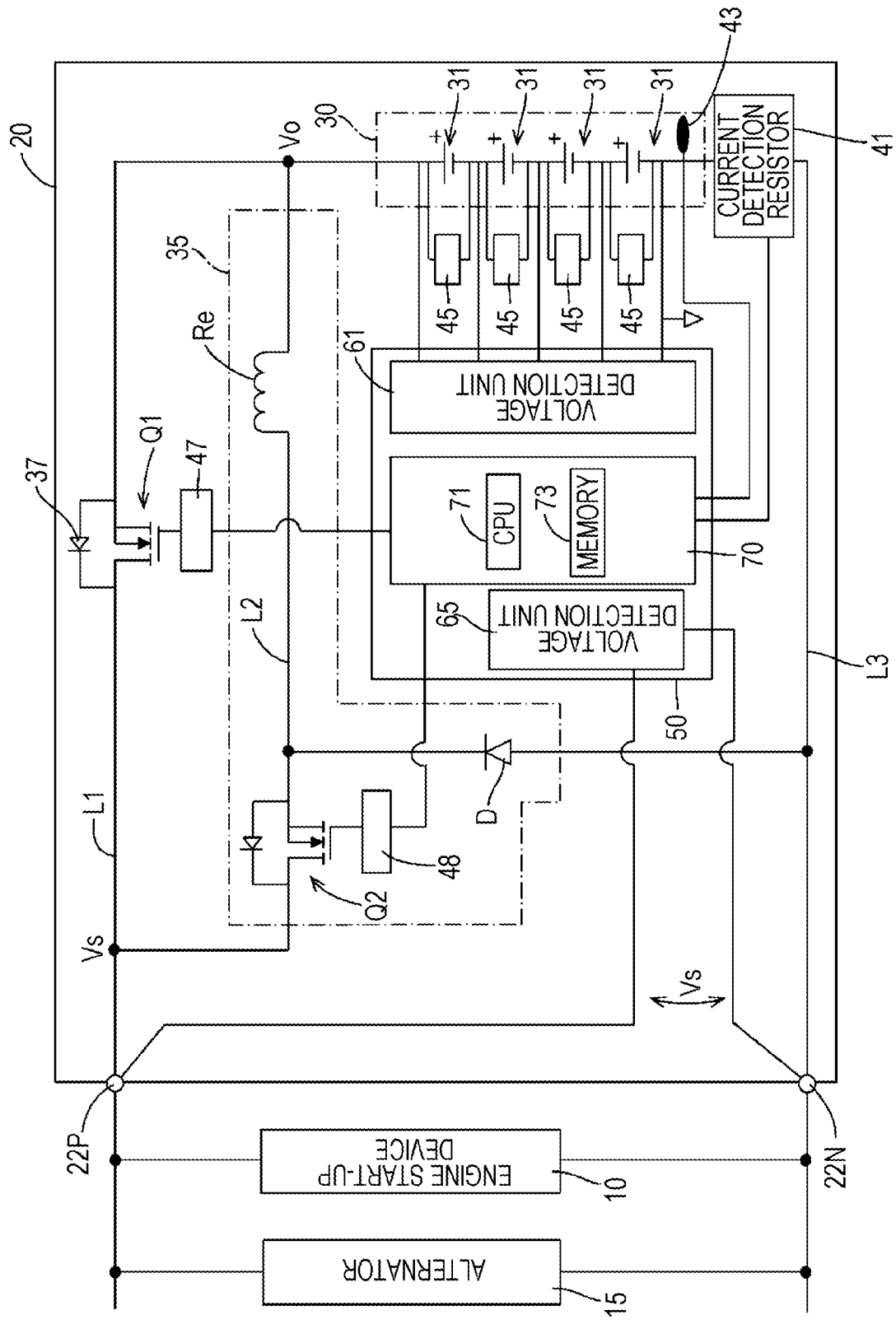
FIG. 4 is a circuit diagram of the battery.

The battery 20 is for engine start-up, and as shown in FIG. 4, the engine start-up device 10 and the alternator 15 are electrically connected to the battery 20 through the positive electrode terminal 22P and the negative electrode terminal 22N being external terminals. As shown in FIG. 4, the battery 20 includes an assembled battery 30, a semiconductor switch Q1, a step-down circuit 35, and a management device 50. In addition, the battery 20 includes a first energizing path L1 and a second energizing path L2 as energizing paths connecting the positive electrode terminal 22 P and the positive electrode of the assembled battery 30.

The semiconductor switch Q1 is provided in the first energizing path L1. The semiconductor switch Q1 is an N-channel FET (Field Effect Transistor). The semiconductor switch Q1 has a drain connected to the positive electrode terminal 22P and a source connected to the positive electrode of the assembled battery 30. A driver 47 is connected to the gate of the semiconductor switch Q1. A control signal from the controller 70 is input into the driver 47, and the semiconductor switch Q1 functions to open and close the first energizing path L1 in response to the instructions from the controller 70 (control signal).

In addition, the semiconductor switch Q1 includes a parasitic diode 37. In the parasitic diode 37, the discharging direction of the assembled battery 30 is in the forward direction, so that even when the semiconductor switch Q1 is controlled to hold the off state, the assembled battery 30 can be discharged through the parasitic diode 37. It should be noted that the semiconductor switch Q1 is an example of the "first switch".

The step-down circuit 35 is provided in the second energizing path L2. The step-down circuit 35 is a step-down chopper, and includes a semiconductor switch Q2, a reactor Re, and a freewheeling diode D. The semiconductor switch Q2 is an N-channel FET (Field Effect Transistor). The semiconductor switch Q2 is provided in the second energizing path L2, and has a drain connected to the positive electrode terminal 22P and a source connected to the reactor Re. A driver 48 is connected to the gate of the semiconductor switch Q2. A control signal from the controller 70 is input into the driver 48, and the semiconductor switch Q2 functions to open and close the second energizing path L2 in response to the instructions from the controller 70 (control signal). It should be noted that the semiconductor switch Q2 is an example of the "second switch".

The reactor Re is provided in the second energizing path L2, one end of the reactor Re is connected to the source of the semiconductor switch Q2, and the other end is connected to the positive electrode of the assembled battery 30. The freewheeling diode D has a cathode connected to the intermediate connection point between the semiconductor switch Q2 and the reactor Re, and an anode connected to the ground line L3.

The step-down circuit 35 performs the step-down function of the output voltage of the alternator 15 (charge voltage) by switching the semiconductor switch Q2 at a predetermined cycle. Specifically, when the semiconductor switch Q2 is turned on, a current flows through the reactor Re in the second energizing path L2, and the reactor Re stores magnetic energy. Then, when the semiconductor switch Q2 is turned off, the reactor Re discharges the stored magnetic energy through the freewheeling diode D. Periodically repeating this operation steps decrease the voltage.

In addition, switching the duty ratio Dy of the semiconductor switch Q2 allows the output voltage of the step-down circuit 35 (step-down amount) to be adjusted.

The assembled battery 30 includes a plurality (four in the present example) of lithium ion secondary batteries connected in series (an example of the "energy storage device"). The secondary battery 31 is, for example, an iron phosphate-based lithium ion secondary battery using lithium iron phosphate (LiFePO4) for the positive active material and carbon (graphite) for the negative active material.

Figure 5:
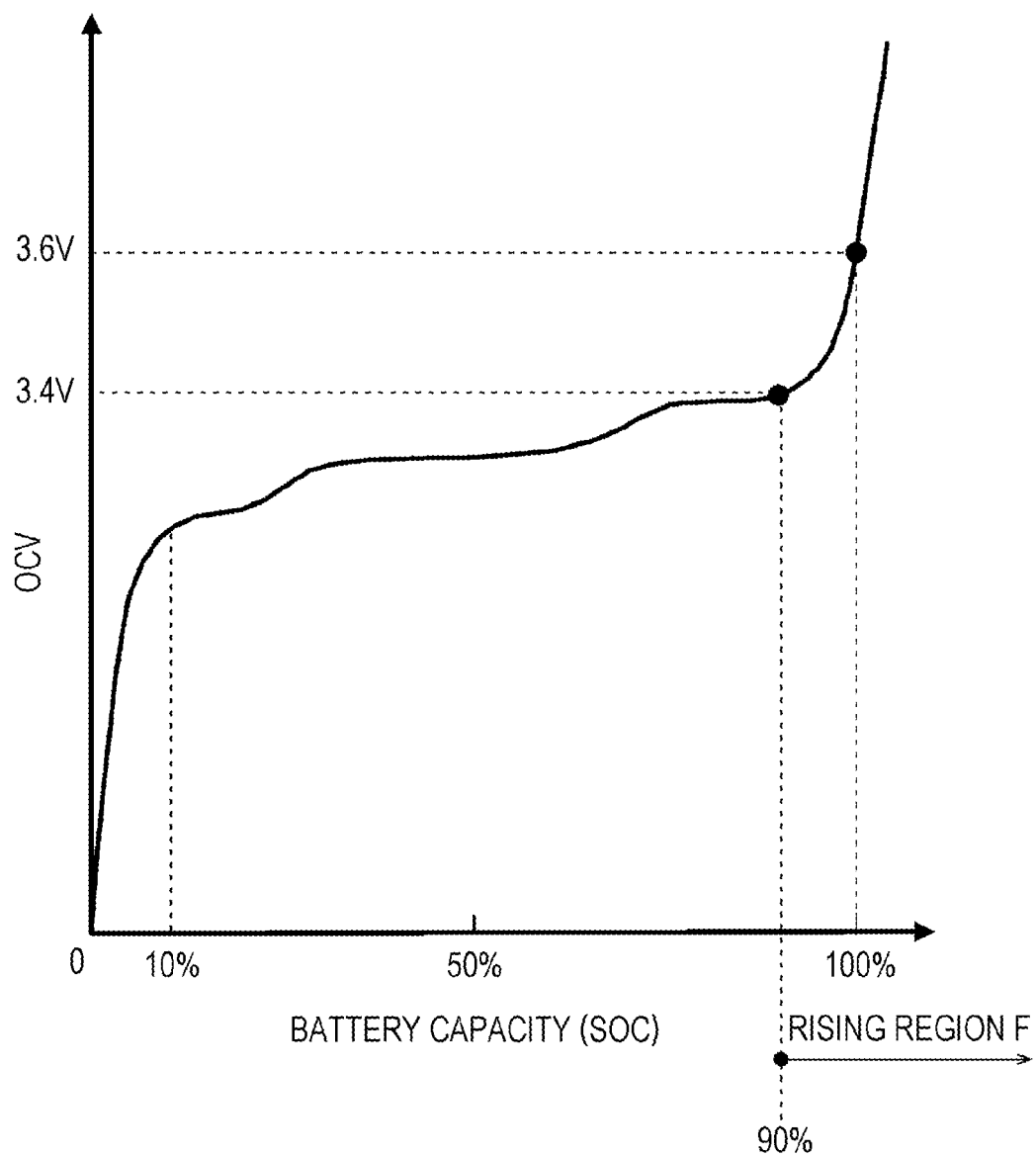
FIG. 5 is a graph showing the SOC-OCV characteristics of a secondary battery.

It should be noted that the "iron phosphate-based" lithium ion secondary battery" is a lithium ion secondary battery using lithium iron phosphate (LiFePO4) for the positive active material, and the negative active material may be, for example, lithium titanate or silicon in addition to carbon. FIG. 5 shows the SOC-OCV correlation characteristics of the iron phosphate-based lithium-ion secondary battery 31.

As shown in FIG. 5, the iron phosphate-based lithium-ion secondary battery 31 has a low change region in which the change amount of the OCV with respect to the change amount of the SOC is relatively low and a high change region in which the change amount of the OCV with respect to the change amount of the SOC is relatively high. Specifically, an initial stage of charge (end stage of discharge), where the SOC is less than 10%, is a high change region in which the OCV abruptly changes with respect to the change amount of the SOC. In addition, an end stage of charge where the SOC is 90% or more (rising region F shown in FIG. 5) is also a high change region where the OCV abruptly changes with respect to the change amount of the SOC. In addition, an middle stage of charge (middle stage of discharge) where the SOC is 10% or more and less than 90% is a flat region (plateau region) where the OCV is approximately constant with respect to the SOC. It should be noted that the SOC means a state of charge, and the OCV means an open circuit voltage.

In addition, as shown in FIG. 4, the battery 20 includes a current detection resistor 41, a temperature sensor 43, and a discharge circuit 45.

The current detection resistor 41 is provided on the negative electrode side of the assembled battery 30 and functions to detect a current flowing through the secondary batteries 31. In addition, the temperature sensor 43 is a contact type or a non-contact type and functions to measure the temperature [° C.] of the secondary battery 31.

The current detection resistor 41 and the temperature sensor 43 are electrically connected to the management device 50 with a signal line, and the detection values of the current detection resistor 41 and the temperature sensor 43 are incorporated into the management device 50.

Figure 6:
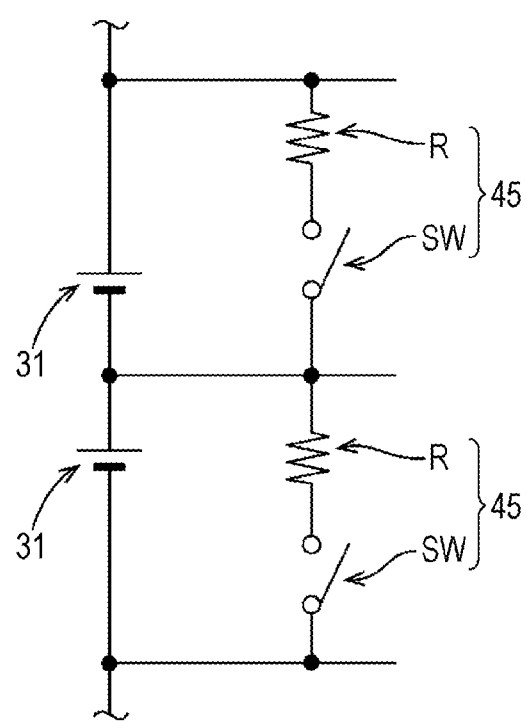
FIG. 6 is a circuit diagram of a discharge circuit.
Figure 7:
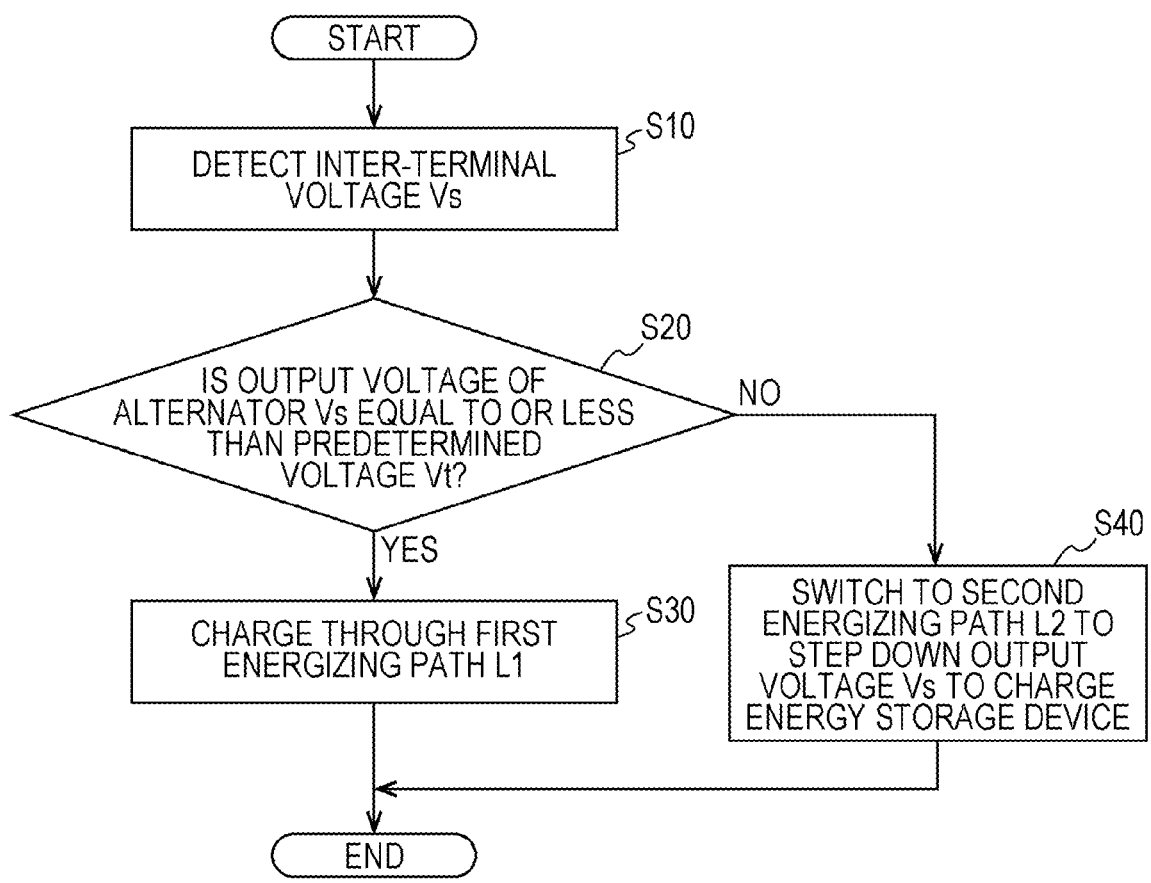
FIG. 7 is a flowchart showing a flow of a process of switching the charge voltage.

The discharge circuit 45 is provided for each secondary battery 31. As shown in FIG. 6, the discharge circuit 45 includes a discharge resistor R and a discharge switch SW, and is connected in parallel to the secondary battery 31. Giving instructions from the controller 70 to turn on the discharge switch SW allows the secondary battery 31 to be discharged individually.

The management device 50 is a device for managing the battery 20, and includes a first voltage detection unit 61, a second voltage detection unit 65, and a controller 70. The first voltage detection unit 61 is connected to both ends of each secondary battery 31 through detection lines and functions to measure the voltage of each secondary battery 31 and the total voltage of the assembled battery 30.

The second voltage detection unit 65 is connected to the positive electrode terminal 22P and the negative electrode terminal 22N through the detection lines, and functions to detect the output voltage Vs of the alternator 15 by measuring the inter-terminal voltage Vs. It should be noted that the second voltage detection unit 65 is an example of the "detection unit".

The controller 70 includes a CPU 71 being a central processing unit and a memory 73. The CPU 71 monitors the current, the voltage, and the temperature of the secondary battery 31 from the outputs of the current detection resistor 41, the first voltage detection unit 61, and the temperature sensor 43, and monitors the output voltage of the alternator 15 from the output of the second voltage detection unit 65. The information for monitoring the battery 20, and the data for performing the switching control of the charge voltage and the balancing processing of the secondary battery described below are stored in the memory 73.

The management device 50, the semiconductor switch Q1, the step-down circuit 35, the discharge circuit 45, and the current detection resistor 41 are mounted on the circuit board 28, and are provided inside the battery 20. In addition, the temperature sensor 43 is also provided inside the battery 20.

3. Switching Control Over Charge Voltage

In the present embodiment, the charge target voltage of the total voltage of the assembled battery 30 is 14.4 V and the assembled battery 30 is charged to the charge target voltage by the alternator 15. However, if the battery 20 is charged at a voltage higher than the predetermined voltage Vt (for example, 15.5 V), which is the upper limit of the appropriate value of the charge voltage to charge the battery 20, due to a factor such as abnormalities of the alternator 15, the battery 20 may be applied with overvoltage. Therefore, after charging starts, the controller 70 performs switching control over the charge voltage (FIG. 7) described below.

The controller 70 can decide whether the battery 20 is in a charge state or a discharge state from the polarity of the current value detected by the current detection resistor 41. Then, when detecting that the battery 20 is in a charge state, the controller 70 measures the inter-terminal voltage Vs with the second voltage detection unit 65 to detect the output voltage Vs of the alternator 15 (S10). Next, the controller 70 performs processing for comparing the output voltage Vs of the alternator 15 with the predetermined voltage Vt (S20).

Then, when the output voltage Vs of the alternator 15 is equal to or less than the predetermined voltage Vt, the controller 70 selects the normal mode shown in FIG. 8, and controls the semiconductor switch Q1 in a state of holding ON (holding the duty ratio of 100%) and the semiconductor switch Q2 of the step-down circuit 35 in a state of holding OFF (holding the duty ratio of 0%). Thus, since energization is possible only on the first energizing path L1, the battery 20 is charged with the output voltage Vs of the alternator 15.

On the other hand, when the output voltage Vs of the alternator 15 is higher than the predetermined voltage Vt, the controller 70 selects the step-down mode shown in FIG. 8, and switches the semiconductor switch Q1 from the state of holding ON to the state of holding OFF.

Thus, the first energizing path L1 is blocked. In addition, the controller 70 switches the semiconductor switch Q2 of the step-down circuit 35 from the state of holding OFF to the switching control in which ON and OFF are repeated in a predetermined period (S40). This allows the second energizing path L2 to be energized and the output voltage Vs of the alternator 15 to be step-downed by the step-down circuit 35 to charge the battery 20.

Thus, the charge voltage of the battery 20 can be lowered and the battery 20 can be prevented from being applied with overvoltage.

It should be noted that in the present example, the switching frequency of the semiconductor switch Q2 is 100 Hz to several kHz, and the "holding ON" means that the semiconductor switches Q1 and Q2 are held in the state of 100% duty ratio for a time longer than the switching period of the semiconductor switch Q2 (for example, at least several periods or more). In addition, similarly, the "holding off" means that the duty ratio Dy is held in the state of 0% for a time longer than the switching period (for example, at least several periods or more).

In addition, the output voltage Vo of the step-down circuit 35 is determined by the output voltage Vs of the alternator 15 and the duty ratio Dy of the semiconductor switch Q2. Therefore, it is preferable that the controller 71 determines the duty ratio Dy of the semiconductor switch Q1 in such a manner that the output voltage Vo after the step down becomes an appropriate value equal to or less than the predetermined voltage Vt (voltage appropriate for charge, for example, 15 V).

$$Dy=Ton/(Ton+Toff) \qquad \text{Equation (1)}$$

Ton is the ON time of the semiconductor switch Q2, and Toff is the OFF time of the semiconductor switch Q2.

In addition, during the charge, when the state where the current does not substantially flow continues for a predetermined time, the controller 70 decides that the charge has been completed based on the detection value of the current detection resistor 41, and performs the processing of returning the control patterns of the semiconductor switches Q1 and Q2 to the normal mode shown in FIG. 8.

4. Response at Engine Start-Up

The controller 71 maintains the normal mode at the time of discharge, and the battery 20 discharges through the first energizing path L1. In the first energizing path L1, only the semiconductor switch Q1 is provided, and elements such as a reactor serving as a large load on the transient current are not arranged. Therefore, a large current can be momentarily supplied, and the response of power is much higher than that through the second energizing path L2. Therefore, at engine start-up, a cranking current of the required magnitude can be supplied in a short time, and engine start failure can be prevented from occurring.

Figure 9:
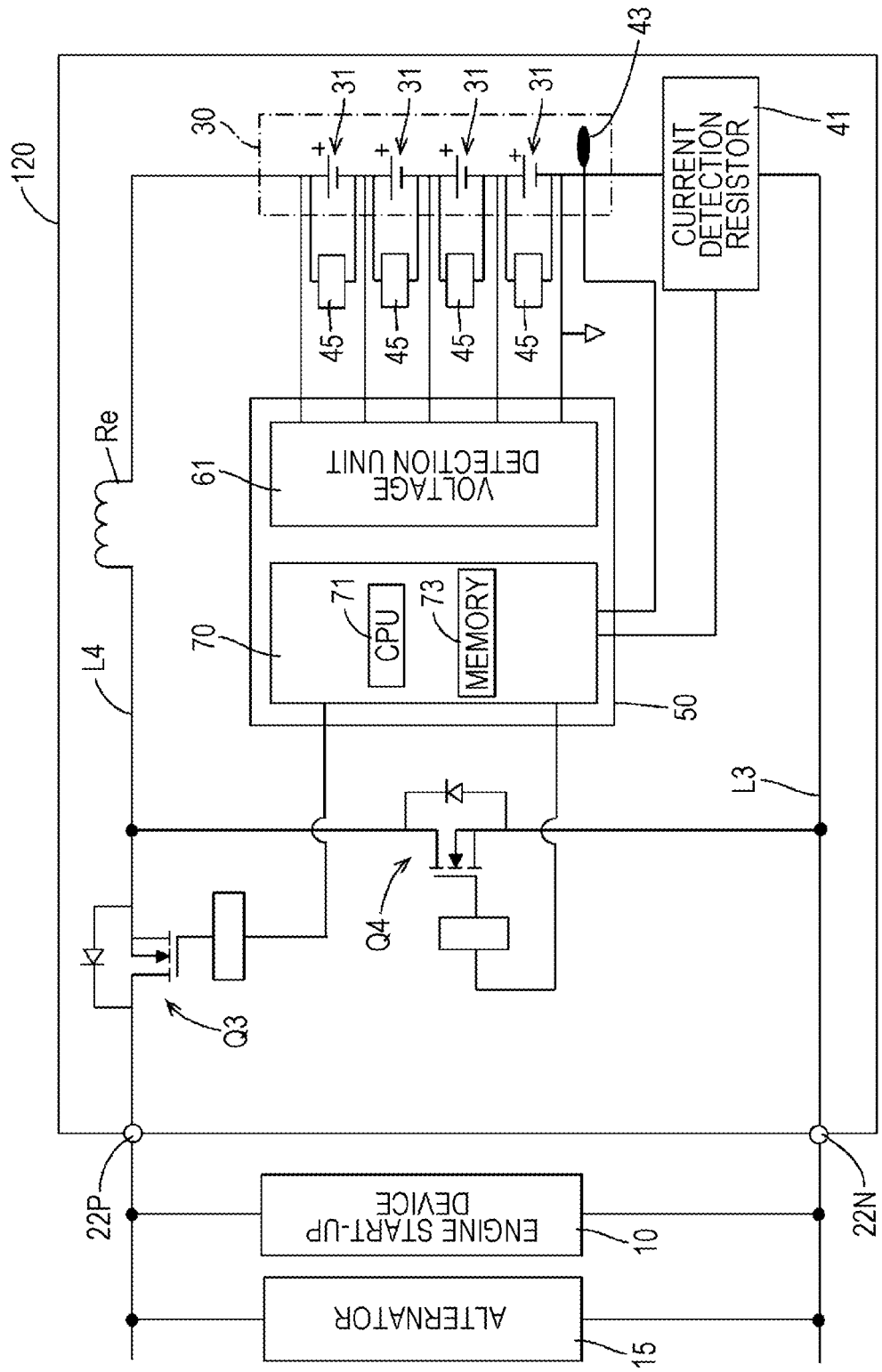
FIG. 9 is a circuit diagram showing a comparative example of a battery.

FIG. 9 is a circuit diagram showing a comparative example of a battery 20. The battery 120 shown in FIG. 9 can step down the output voltage Vs of the alternator 15 by performing switching control on the semiconductor switch Q4 with the semiconductor switch Q3 held ON. However, the battery 120 includes only one energizing path L4, and a reactor Re is provided on the path L4. Since the reactor Re is a large load on a transient current, it is difficult to supply a momentary large current in the circuit configuration shown in FIG. 9, so that the circuit configuration is unsuitable for engine start-up.

Similarly, since the reactor Re is provided in the second current path L2 of the battery 20, the response of power is lower than that of the first current path L1, and the second current path L2 is not suitable for supplying a momentary large current.

5. Voltage Balancing Processing by Discharge Circuit 45

After starting charge, the controller 70 compares the voltage of each secondary battery 31 measured by the first voltage detection unit 61 with a threshold (3.5 V, for example). Then, all the discharge circuits 45 corresponding to the secondary battery 31 exceeding the threshold value are operated, and the secondary battery 31 exceeding the threshold value is discharged with a resistor.

Thus, since the voltage of the secondary battery 31 having a high voltage drops, the voltages of the secondary batteries 31 can be balanced. Therefore, during charging, the voltage of the specific secondary battery 31 can be prevented from increasing a level of overvoltage due to voltage variations.

It should be noted that in the present embodiment, the charge target voltage of the assembled battery 30 is "14.4 V", and the voltage obtained by dividing it by the number of cells is "3.6 V". In addition, the threshold value at which the balancing processing is performed is "3.5 V".

Therefore, at the end stage of the charge when the voltage of the assembled battery 30 approaches the target charge voltage, the voltage balancing processing by the discharge circuit 45 is performed. Therefore, at the end stage of the charge, the voltage of the specific secondary battery 31 can increase while the voltage variation of each secondary battery 31 constituting the assembled battery 30 is prevented.

At the end stage of the charge, the voltage variation can easily increase. However, since the voltage variation of the secondary battery 31 can be prevented by the performance of the voltage balancing processing within the region, the voltage of the specific secondary battery 31 can be prevented from increasing to a level of overvoltage.

6. Description of Effect

In the present embodiment, since discharge is performed through the first energizing path L1 at engine start-up, a large current can be momentarily discharged. In addition, when the output voltage Vs of the alternator 15 is higher than the predetermined voltage Vt, switching to the second energizing path L2 is performed, and the output voltage Vs is stepped down in the step-down circuit 35 to be charged. Therefore, the battery 20 can be prevented from being applied with overvoltage while the response at engine start-up is secured.

In addition, the battery 20 incorporates the step-down circuit 35 and detects the output voltage Vs of the alternator 15 by itself. Therefore, even if the battery 20 is mounted on a vehicle that does not have the function of communicating with the battery 20, when the output voltage Vs of the alternator 15 is higher than the predetermined voltage Vt, the output voltage Vs can be stepped down by the battery alone to prevent the battery 20 from being applied with overvoltage.

Other Embodiments

The present invention is not limited to the embodiment described by the above description and drawings, and for example, the following embodiments are also included in the technical scope of the present invention.

(1) In the above embodiment, the battery 20 is mounted on a car, but it may be mounted on, for example, a motorcycle in addition to the above. That is, as long as the vehicle is driven by an engine, the present technique can be applied.

(2) In the above embodiment, the semiconductor switch Q1 is used as an example of the first switch, but a relay may be used instead of the semiconductor switch Q1. In addition, even when a semiconductor switch is used, an element other than FET such as a power transistor may be used. In addition, the same applies to the second switch.

(3) In the above embodiment, the iron phosphate-based lithium ion secondary battery 31 is exemplified as an example of the energy storage device, but the present invention can also be applied to, for example, a ternary lithium ion secondary battery. It should be noted that the ternary lithium ion secondary battery is a battery that uses lithium-containing metal oxide containing elements of Co, Mn, and Ni for the positive active material and graphite, carbon, and the like for the negative active material. In addition, the energy storage device may be another secondary battery such as a lead-acid battery or a capacitor.

(4) In the above embodiment, an example in which the discharge circuit 45 is provided is shown, but a circuit configuration without the discharge circuit 45 can be adopted. In addition, an example in which a plurality of energy storage devices is connected in series is shown, but one energy storage device may be used.

(5) In the above embodiment, the switching from the step-down mode to the normal mode is performed by detecting completion of the charge. However, what is required is to, at least, select the normal mode at engine start-up, and it is also possible to perform the switching of the mode by, for example, detecting the ON operation of the ignition switch.

(6) In the above embodiment, an example in which the output voltage Vs of the alternator 15 is detected by the second voltage detection unit 65 built in the battery 20 is shown, but when the battery and the vehicle can communicate with each other, the information on the output voltage Vs of the alternator 15 may be obtained by communication from the vehicle. In addition, in that case, the second voltage detection unit 65 can be eliminated.

What is claimed is:

1. An energy storage apparatus for engine start-up, the energy storage apparatus comprising:
   a battery case including an external terminal;
   an energy storage device;
   a first switch provided in a first energizing path from the external terminal to a terminal of the energy storage device;
   a step-down circuit provided in a second energizing path from the external terminal to the terminal of the energy storage device, the second energizing path being connected to the external terminal and to the terminal of the energy storage device in parallel to the first energizing path; and
   a controller,
   wherein the controller:
      turns the first switch on to discharge the energy storage device through the first energizing path such that a cranking current is provided to an engine start-up device at the engine start-up; and
      turns the first switch off to select the second energizing path if an output voltage of a vehicle generator is higher than a predetermined voltage to cause the output voltage of the vehicle generator to be stepped down with the step-down circuit to charge the energy storage device,
   wherein the first switch is located outside of the second energizing path, and
   wherein the step-down circuit includes a second switch provided in the second energizing path, the second switch being directly connected to the first switch and the external terminal.

2. The energy storage apparatus for engine start-up according to claim 1, wherein the step-down circuit includes a step-down chopper, including:
   the second switch provided in the second energizing path;
   a reactor provided in the second energizing path, the reactor including one end connected to the second switch and another end connected to a positive electrode of the energy storage device through the terminal of the energy storage device; and a freewheeling diode including:
a cathode connected to an intermediate connection point between the second switch and the reactor; and
an anode connected to a negative electrode of the energy storage device.

3. The energy storage apparatus for engine start-up according to claim 1, further comprising a detection unit configured to detect the output voltage of the vehicle generator.

4. The energy storage apparatus for engine start-up according to claim 3, further comprising external terminals, including the external terminal, to which the vehicle generator is connected,
wherein the detection unit detects a voltage between the external terminals as the output voltage of the vehicle generator.

5. The energy storage apparatus for engine start-up according to claim 1, wherein the step-down circuit steps down the output voltage of the vehicle generator to a value equal to or less than the predetermined voltage.

6. The energy storage apparatus for engine start-up according to claim 1, further comprising a plurality of discharge circuits,
wherein the energy storage device comprises a plurality of energy storage devices connected in series,
wherein the discharge circuits are connected in parallel with the energy storage devices and are configured to discharge the energy storage devices, and
wherein the controller operates the discharge circuits to equalize voltages of the energy storage devices while the energy storage devices are charged.

7. The energy storage apparatus for engine start-up according to claim 1, wherein the first switch includes a Field Effect Transistor (FET) including a parasitic diode having a forward direction in a discharge direction.

8. The energy storage apparatus for engine start-up according to claim 1, wherein the energy storage device includes an iron phosphate-based lithium ion secondary battery that includes the terminal of energy storage device.

9. A vehicle, comprising:
an engine start-up device;
an energy storage apparatus according to claim 1; and
the vehicle generator connected to external terminals, including the external terminal, of the energy storage apparatus.

10. The energy storage apparatus for engine start-up according to claim 2, further comprising a detection unit configured to detect the output voltage of the vehicle generator.

11. The energy storage apparatus for engine start-up according to claim 1, wherein the step-down circuit further includes:
a reactor provided in the second energizing path, the reactor including one end coupled to the second switch and another end coupled to the first switch.

12. The energy storage apparatus for engine start-up according to claim 11, wherein said another end of the reactor is further coupled to a positive electrode of the energy storage device through the terminal of the energy storage device.

13. The energy storage apparatus for engine start-up according to claim 1, wherein the first switch comprises a parasitic diode for discharging the energy storage device when the controller turns off the first switch.

14. The energy storage apparatus for engine start-up according to claim 13, wherein the controller is connected to a gate of the first switch.

15. The energy storage apparatus for engine start-up according to claim 1, wherein
the second switch is connected to the terminal of the energy storage device.

16. The energy storage apparatus for engine start-up according to claim 1, wherein, after the controller turns the first switch on, through the first energizing path, current is discharged from the energy storage device toward the first switch in a reverse direction than a direction that, when the first switch is off, the current flows through the first energizing path from the second switch toward the energy storage device.

17. A method for controlling an energy storage apparatus for an engine start-up, the method comprising:
discharging, via a switch, an energy storage device through a first energizing path having a higher response than a second energizing path including a step-down circuit, such that a cranking current is provided to an engine start-up device at the engine start-up, the energy storage device being placed in a battery case that includes an external terminal; and
selecting the second energizing path if an output voltage of a vehicle generator is higher than a predetermined voltage to step down the output voltage of the vehicle generator with the step-down circuit to charge the energy storage device,
wherein the first energizing path extends from the external terminal to a terminal of the energy storage device, and
wherein the second energizing path is connected to the external terminal and to the terminal of the energy storage device in parallel to the first energizing path,
wherein the switch is located outside of the second energizing path, and
wherein the step-down circuit includes another switch provided in the second energizing path, the second switch being directly connected to the switch and the external terminal.

18. An energy storage apparatus, comprising:
a battery case including an external terminal;
an energy storage device;
a switch provided in a first energizing path from the external terminal to a terminal of the energy storage device;
a step-down circuit provided in a second energizing path from the external terminal to the terminal of the energy storage device, the second energizing path being connected to the external terminal and to the terminal of the energy storage device in parallel to the first energizing path; and
a controller that turns the switch on to discharge the energy storage device via the first energizing path and turns the switch off to charge the energy storage device via the step-down circuit in the second energizing path,
wherein the controller turns the switch on to discharge the energy storage device through the first energizing path such that a cranking current is provided to an engine start-up device at an engine start-up,
wherein the switch is located outside of the second energizing path, and
wherein the step-down circuit includes another switch provided in the second energizing path, said another switch being coupled to the switch and the external terminal.

19. The energy storage apparatus according to claim 18, wherein, when an output voltage of a vehicle generator is higher than a predetermined voltage to cause the output voltage of the vehicle generator to be stepped down with the step-down circuit to charge the energy storage device, the controller turns the switch off to select the second energizing path.

20. The energy storage apparatus according to claim 18, wherein the step-down circuit further includes:
   a reactor provided in the second energizing path, the reactor including one end coupled to said another switch and another end coupled to the switch.

* * * * *